United States Patent [19]

Yagitani et al.

[11] Patent Number: 4,548,745
[45] Date of Patent: Oct. 22, 1985

[54] CAPACITOR COMPRISING METALLIZED POLYPROPYLENE FILM IMPREGNATED WITH A CERTAIN BIS-(ALKYLPHENYL) ALKANE

[75] Inventors: Takayuki Yagitani, Nishinomiya; Hiromasa Matsui, Ashiya; Akira Ito, Iwaki; Toshishige Ueno, Iwaki, all of Japan

[73] Assignee: Kureha Kagaku Kogyo Kabushiki Kaisha, Tokyo, Japan

[21] Appl. No.: 523,566

[22] Filed: Aug. 16, 1983

[30] Foreign Application Priority Data

Aug. 31, 1982 [JP] Japan ................. 57-151274

[51] Int. Cl.[4] .................. H01G 4/22; H01G 4/32
[52] U.S. Cl. .................... 252/567; 252/570; 361/315; 585/6.3
[58] Field of Search ............... 252/567, 570; 361/315; 585/6.3

[56] References Cited

U.S. PATENT DOCUMENTS 3,593,072 7/1971 Bailey ................................. 361/274
4,068,286 1/1978 Iijima et al. ........................ 252/567
4,288,837 9/1981 Nishimastu et al. ............... 252/567
4,330,439 5/1982 Nishimatsu et al. ............... 252/570

FOREIGN PATENT DOCUMENTS 40551 4/1976 Japan.
2013967 3/1982 Japan.
2082626 3/1982 United Kingdom.

Primary Examiner—John E. Kittle
Assistant Examiner—Mukund J. Shah
Attorney, Agent, or Firm—Oblon, Fisher, Spivak, McClelland & Maier

[57] ABSTRACT

Disclosed herein is a capacitor comprising a metallized polypropylene film impregnated with a specified impregnating oil, i.e., a 1,2-bis(alkylphenyl)ethane, the thus prepared capacitor being suitable for use under a high voltage and a high potential gradient.

9 Claims, 3 Drawing Figures

CAPACITOR COMPRISING METALLIZED POLYPROPYLENE FILM IMPREGNATED WITH A CERTAIN BIS-(ALKYLPHENYL) ALKANE

BACKGROUND OF THE INVENTION

The present invention relates to a capacitor made of a metallized polypropylene film impregnated with a specified dielectric medium, which has a high withstanding voltage and a self-healing property, suitable for use under a high voltage and a higher potential gradient than ever, and more particularly relates to a capacitor comprising, as a dielectric material, metallized polypropylene film impregnated with a 1,2-bis(alkylphenyl)ethane represented by the general formula (I):

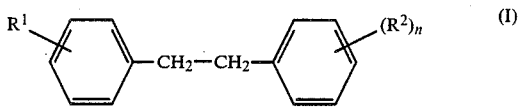

wherein $R^1$ represents a hydrogen atom or a methyl group; $R^2$ represents a methyl group, ethyl group, propyl group or isopropyl group and n is 1 or 2, with the proviso that when $R^1$ represents a methyl group, $R^2$ represents a methyl group.

The conventional capacitors made of a metallized polypropylene film (polypropylene film on which a metal has been deposited by vacuum-evaporation) impregnated with a dielectric medium have been used under a relatively low voltage of lower than 600 V and a relatively low potential gradient, and are made by the process comprising the steps of winding a metallized polypropylene film (hereinafter referred to as MPP) to form an element, spraying a metalikon-metal onto the both ends of the thus formed element, thereby carrying out the metalikon (metal-spray-coating) thereon, welding lead wires to the portions carried out with metalikon, impregnating the thus formed element with an oil as a dielectric medium to obtain the oil-impregnated MPP capacitor.

The major reasons why such an oil-impregnated MPP capacitor could not sufficiently exhibit its expected characteristics lie in the occurrence of (1) the loosening of the bonding of the metalikon-metal and vacuum-evaporated and deposited metal, or in the extreme case, the separation of the two metals due to the deormation of polypropylene of MPP caused by the swelling thereof due to the oil impregnated into the element and (2) the separation of the metal particles which have been vacuum-evaporated and deposited onto polypropylene film, from the polypropylene film because of the weakening of the adhesion of the particles to the film. In the latter case, the electric characteristics of the oil-impregnated MPP capacitor such as corona potential, current-resistance, electric power loss and capacity are deteriorated, thereby the life of the capacitor is remarkably reduced.

On the other hand, in the case where a capacitor provided with foil-type electrodes is impregnated with an oil such as mineral oils of a low viscosity and good penetrance, alkylbenzene (hereinafter referred to as AB), alkylnaphthalene (hereinafter referred to as AN), 1-phenyl-1-xylylethane (hereinafter referred to 1,1-PXE), monoisopropyldiphenyl (hereinafter referred to as MIPB), etc. there are many problems such as (i) separation of particles of metalikon-metal from the film, (ii) reduction of adhesion of vacuum-evaporated and deposited metal to the particles of metalikon-metal, (iii) swelling of the part of the film at both ends of the element at the first stage of impregnation resulting in the clogging of the interlayer passage of the oil and thus resultant insufficient impregnation, (iv) reduction of the withstanding voltage due to the insufficiency of the oil in the part between the swelled layers of the film due to the absorption of the oil by polypropylene of MPP around the oil which has entered between the film layers after the completion of impregnation and, (v) the same reduction of the withstanding voltage due to the disturbed inter-layer circuration of the oil due to the raised viscosity of the oil caused by the dissolution of the film by the oil. These problems are caused by the large solubility of polypropylene (hereinafter referred to as PP) film into the oil and swelling of PP film by the oil.

In order to avoid the above-mentioned problems, as a better oil for impregnation into MPP condenser, a vegetable oil such as castor oil, an ester oil such as dioctyl phthalate, silicone oils, polybutene, waxes such as microcrystalline and low-molecular weight polyethylene, mixtures of these waxes and polybutene has been used. However, although the separation of sprayed metalikon-metal and vacuum-evaporated and deposited metal may be prevented by the use of the better oil, it is very difficult to have the element of MPP capacitor impregnated into innerpart thereof with such a highly viscous oil, and it is only effective to partially impregnate the adjacent parts of the electrode end. Accordingly, the MPP capacitor is not able to exhibit its characteristics with a restricted use thereof under a low voltage.

In addition, as a thin dielectric material, metallized insulating paper has been used, however, its dielectric loss is large due to the defect of paper itself and its withstanding voltage is also low. According to the defects of large dielectric loss, MPP has come to be used instead of metallized insulating paper. However, because of the difficulty in impregnating MPP capacitor with an oil, withstanding voltage has been scarcely improved.

Accordingly, the development of MPP capacitor of a high withstanding voltage has been strongly demanded.

The present inventors have studied for preparing MPP capacitor of a high withstanding voltage and as a result attained the present invention.

SUMMARY OF THE INVENTION

In an aspect of the present invention, there is provided a capacitor comprising as a dielectric material, a metallized polypropylene film impregnated with a 1,2-bis(alkylphenyl)ethane represented by the general formula (I):

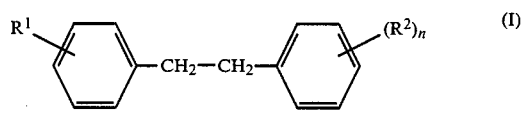

wherein $R^1$ represents a hydrogen atom or a methyl group; $R^2$ represents a methyl group, ethyl group, propyl group or isopropyl group and n is 1 or 2, with the proviso that when $R^1$ represents a methyl group, $R^2$ represents a methyl group.

BRIEF EXPLANATION OF DRAWINGS

In the attached drawings.

DETAILED DESCRIPTION OF THE INVENTION

Figure 1:
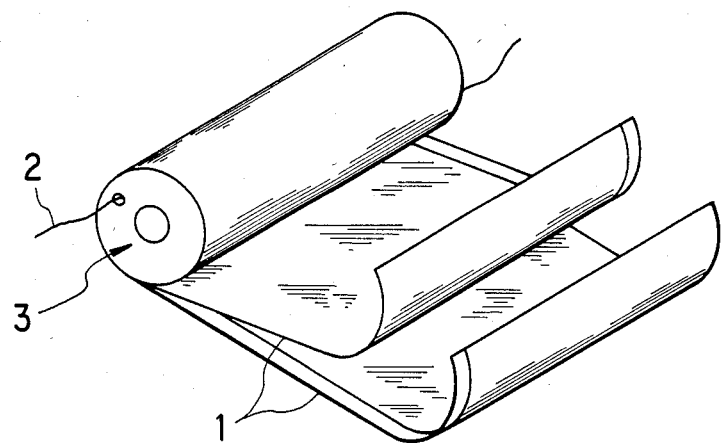
FIG. 1 is an element of a capacitor according to the present invention.

The present invention relates to a capacitor comprising as a dielectric material, a metallized polypropylene film impregnated with a 1,2-bis(alkylphenyl)ethane represented by the general formula (I):

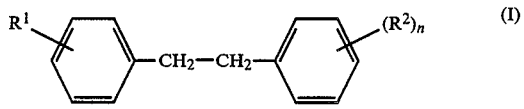

wherein $R^1$ represents a hydrogen atom or a methyl group; $R^2$ represents a methyl group, ethyl group, propyl group or isopropyl group and n is 1 or 2, with the proviso that when $R^1$ represents a methyl group, $R^2$ represents a methyl group.

The object of the present invention is to provide a capacitor made of a metallized polypropylene film impregnated with a specified dielectric medium which (i) does not cause the loosening or separation of metalikon-metal and the vacuum-evaporated and deposited metal, (ii) does not weaken the adhesion of the metal of MPP film or separate the metal of MPP film, (iii) is low in viscosity and compatible with PP film and (iv) dissolves or swells PP film only a little as well as favorably wets the film, which is usable under a high voltage and a high potential gradient.

The MPP film used according to the present invention is prepared by depositing a vacuum-evaporated metal to a PP film having its surface roughly processed to a space factor (hereinafter referred to as SF) of 5 to 15%, represented by the following formula (II):

$$SF = \frac{t_M - t_W}{t_W} \times 100 \quad \text{(II)}$$

wherein $t_M$ represents the thickness of the film measured with a micrometer and $t_W$ is that obtained by gravimetric method. By immersing the element prepared by winding the thus prepared MPP film at a winding strength of causing an increment of static capacity (hereinafter referred to as $\Delta C$) of 10 to 25% in a 1,2-bis(alkylphenyl)ethane of a dielectric constant of 2.4 to 2.6 represented by the following general formula (I):

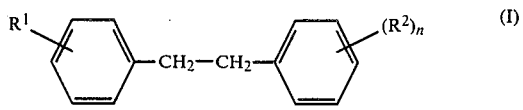

1,2-bis(alkylphenyl)ethane wherein $R^1$ represents a hydrogen atom or a methyl group; $R^2$ represents a methyl-, ethyl-, propyl- or isopropyl group and n is 1 or 2 with the proviso that when $R^1$ represents a methyl group, $R^2$ is a methyl group, the above-mentioned problems have been completely solved.

The 1,2-bis(alkylphenyl)ethane used according to the present invention are exemplified as follows.
1-phenyl-2-n-propylphenylethane (referred to as PPE),
1-phenyl-2-i-propylphenylethane (referred to as CPE),
1-phenyl-2-ethylphenylethane (referred to as EDE),
1-phenyl-2-xylylethane (referred to as 1,2-PXE),
1-phenyl-2-tolylethane (referred to as PTE) and
1,2-ditolylethane (DTE).

In the case where SF is below 5% or $\Delta C$ is below 10%, it is very difficult to impregnate MPP capacitor with a 1,2-bis(alkylphenyl)ethane in a stabilized state, resulting in the reduction of heat-resistance of the thus obtained capacitor, which leads to the reduction of the withstanging voltage of the capacitor.

On the other hand, in the case where SF is over 15%, by the reduction of the effective thickness of the film, which leads also to the reduction of the withstanding voltage of the capacitor.

In the case where $\Delta C$ is over 25%, wrinkles are apt to form in the film and the bonding of the vacuum-evaporated and deposited metal and the metalikon-metal is deteriorated.

In contrast to the corona starting voltage in the level of 30 to 90 V/micrometer of the conventional oil-impregnated MPP capacitor, the present invention can provide a specified medium-impregnated MPP capacitor of the corona starting voltage of 110 to 140 V/micrometer, which can withstand the same field strength as in the foil electrode-type film capacitor by suitably selecting the constitution of the film dielectric materials, the method of winding the film and the dielectric medium.

The present invention will be explained more in detail while referring to the following non-limitative examples:

EXAMPLES 1 TO 4 AND COMPARATIVE EXAMPLES 1 TO 7

Figure 2:
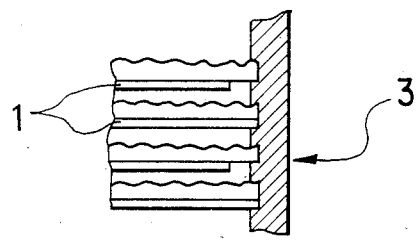
FIG. 2 is a longitudinal cross-sectional view of one of the end portions of an element of a capacitor according to the present invention and FIG. 3 is a graph showing the relationship between the time of heating of the element of a capacitor according to the present invention and the corona starting voltage in the element, wherein 1 is the MPP film impregnated with 1,2-bis(alkylphenyl)ethane, 2 is a lead wire and 3 is the portion subjected to metalikon treatment.

As Examples, 4 groups of capacitors according to the present invention were prepared by impregnating each group of the capacitor-elements ($\Delta C=15\%$) with the respective impregnating oils according to the present invention shown below, each capacitor-element having been prepared by winding two MPP film of 18 micrometers in thickness and 10% in SF (as shown in FIGS. 1 and 2):
CPE, EDE, 1,2-PXE and DTE.

As Comparative Examples, 7 groups of capacitors were prepared by impregnating each group of the same kind of capacitor-elements as above with the respective comparative impregnating oils shown below:
a mineral oil, AB, AN, 1,1-PXE, castor oil, dioctyl phthalate and dimethylsilicone oil.

The physical properties of the impregnating oils according to the present invention and the comparative impregnating oils, the stability of the metal vacuum-evaporated and deposited and the stability of adhesion of metalikon are shown in Table 1 together with the conditions in tests for the physical properties.

The thus prepared capacitors according to the present invention and those of Comparative Examples were subjected to three kinds of corona discharge tests as follows:

(1) Corona starting voltage vs. thermal treatment of the product

Figure 3:
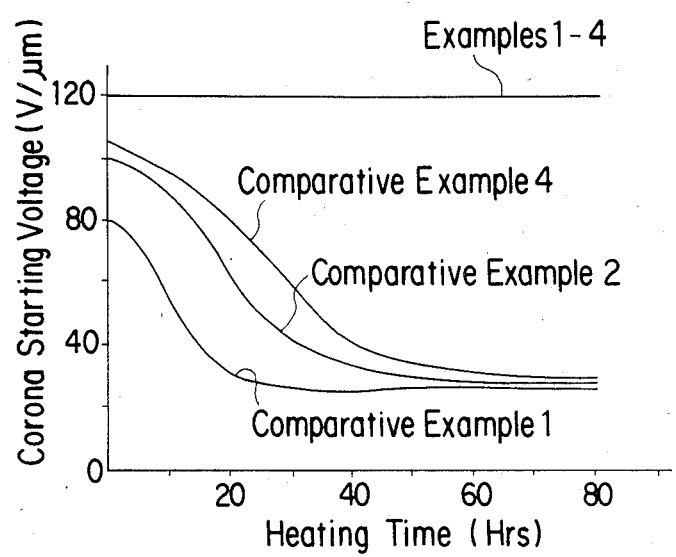

The average corona starting voltage determined at 23° C. on each 5 specimens of each group after keeping the specimens at 70° C. for the respectively determined hours is shown in FIG. 3.

As are seen in FIG. 3, whereas the corona starting voltage was rapidly reduced with the increase of the time of heating at 70° C. on the comparative capacitor impregnated with the mineral oil, AB or 1,1-PXE, such a phenomenon was never experienced on any capacitors according to the present invention prepared by impregnating the same kind of capacitor-element with each of the impregnating oils according to the present invention.

(2) Corona disappearing voltage

The corona starting voltage (at 23° C., at a detecting sensitivity of 20 pq) and the corona disappearing voltage (at 23° C., at a detecting sensitivity of 20 pq, after 0.5 sec of discharge) were determined on the capacitors according to the present invention and the capacitors of Comparative Examples, the results being shown in Table 2. As are seen in Table 2, the capacitors according to the present invention (Examples 1 to 4) are superior to the capacitors in Comparative Examples 5 and 7 in corona characteristic, particularly in corona disappearing voltage. Namely, the difference between the corona starting voltage and the corona disappearing voltage was smaller in the capacitors according to the present invention than in the capacitors of Comparative Examples 5 and 7.

This smaller difference is considered to be due to the superior impregnating property and superior gas-absorbing property of the impregnating oil according to the present invention.

TABLE 1

| | EXAMPLE | | | | COMPARATIVE EXAMPLE | | | | | | |
|---|---|---|---|---|---|---|---|---|---|---|---|
| | 1 | 2 | 3 | 4 | 1 | 2 | 3 | 4 | 5 | 6 | 7 |
| | | | | | Impregnating oil | | | | | | |
| Physical property | CPE | EDE | 1,2-PXE | DTE | mineral oil | AB | AN | 1,1-PXE | castor oil | dioctyl phthalate | dimethyl-silicone oil |
| Specific gravity | 0.963 | 0.971 | 0.987 | 0.986 | 0.880 | 0.870 | 0.755 | 0.988 | 0.959 | 0.986 | 0.960 |
| Pour point (°C.) | −60 | −60 | −60 | −60 | −30 | −60 | −47.5 | −47.5 | −15 | −32 | −55 |
| Viscosity (cst) | | | | | | | | | | | |
| at 50° C. | 3.4 | 2.7 | 2.7 | 2.6 | 7.0 | 6.4 | 4.5 | 3.9 | 55 | 21 | 33 |
| at 40° C. | 4.3 | 3.3 | 3.3 | 3.2 | 9.1 | 8.9 | 6.1 | 5.2 | 105 | 44 | 39 |
| at 10° C. | 11.8 | 7.1 | 7.2 | 7.1 | 40.5 | 34.5 | 19.5 | 15.1 | 1950 | 280 | 80 |
| Gas absorption[1] | 150 | 150 | 150 | 150 | 22 | 50 | 150 | 150 | −20 | 35 | −25 |
| Suitability to polypropylene film | 4.0 | 4.0 | 4.0 | 4.0 | 8 | 7.5 | 5.5 | 5.0 | 4.5 | 6.0 | 5.5 |
| Swelling, in increase of thickness at 80° C. (%) | | | | | | | | | | | |
| Dissolution at 80° C. (% by wt.) | 0.1 | 0.1 | 0.1 | 0.1 | 0.1 | 0.1 | 0.2 | 3.1 | 0.1 | 0.1 | 0.1 |
| Wettability mm²[2] | 180 | 180 | 180 | 180 | 70 | 70 | 110 | 110 | 35 | 40 | 80 |
| Stability of deposited metal[3] | good | good | good | good | bad | bad | poor | poor | good | good | good |
| Stability of adhesion of metalikon[4] | good | good | good | good | bad | bad | bad | poor | bad | good | good |

[Notes]
[1]Gas absorption
The amount of gaseous hydrogen absorbed by the impregnating oil under the conditions of the oil temperature of 80° C. and the potential gradient of 4 kV/mm during 30 min. determined by using Thtonton-type apparatus and shown in the differential pressure of a manometer in cm.
[2]Wettability
On a polypropylene film, 0.2 microliter of the impregnating oil was dropped while using a microcyringe, and then another polypropylene film is placed on the first film gently. After one hour of placing, the area occupied by the expanded oil between the two films was measured.
[3]Stability of deposited metal
This property was determined by the amount of resistance of the membrane after a thermal treatment of 100 hours at 80° C. as follow:
good: change is small
poor: change is relatively large
bad: change is large
[4]Stability of adhesion of metalikon
This property was determined by the change of adhesion after 100 hours of keeping the specimen at 80° C.
good: no change
poor: a change was recognized a little
bad: change is remarkable.

TABLE 2

| | Impregnating oil | Corona starting Voltage (V/micrometer) | Corona disappearing (Voltage/ micrometer) |
|---|---|---|---|
| Example | | | |
| 1 | CPE | 120 | 110 |
| 2 | EDE | 120 | 110 |
| 3 | 1,2-PXE | 120 | 110 |
| 4 | DTE | 120 | 110 |
| Comparative example | | | |
| 5 | castor oil | 80 | 45 |
| 7 | dimethylsilicone | 85 | 50 |

(3) Time period of heat treatment

In general, after impregnating a capacitor-element, the thus impregnated capacitor-element is subjected to a heat-treatment at a certain temperature for a certain time period to obtain the capacitor.

In this test, each capacitor-element after being impregnated with one of the impregnating oil according to the present invention, and each capacitor-element after being impregnated with castor oil or dimethylsilicone oil were kept at a temperature of 70° C. for a time period before the determination of corona starting voltage.

Time period of heat-treatment until the corona starting voltage attained a value at a temperature of 70° C. is shown in Table 3.

As are seen in Table 3, the time period of heat-treatment until the corona starting voltage attained the value at a temperature of 70° C. was far smaller in the capacitor according to the present invention than in the capacitor impregnated with castor oil or dimethylsilicone oil. The result has large meanings that the capacitor according to the present invention can be economically and rationally prepared and that the thus prepared capacitor has stabilized corona characteristics.

TABLE 3

| | Impregnating oil | Time period of heat-treatment (min) |
|---|---|---|
| Example | | |
| 1 | CPE | 2 |
| 2 | EDE | 2 |
| 3 | 1,2-PXE | 2 |
| 4 | DTE | 2 |
| Comparative Example | | |
| 5 | castor oil | 40 |
| 7 | dimethylsilicone oil | 34 |

What is claimed is:

1. A capacitor comprising, as a dielectric material, a metallized polypropylene film impregnated with a 1,2-bis-(alkylphenyl)ethane having the formula (I):

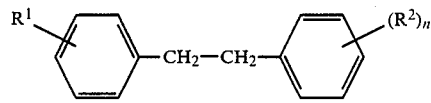

wherein $R^1$ represents a hydrogen atom or a methyl group; $R^2$ represents a methyl, ethyl, propyl or isopropyl group and n is 1 or 2, with the proviso that when $R^1$ represents a methyl group, $R^2$ represents a methyl group, and wherein the metallized polypropylene film is a rough-surfaced film having a space factor of 5 to 15%, said spaced factor being defined by the formula (II):

$$\frac{t_M - t_W}{t_W} \times 100 \qquad (II)$$

where $t_M$ is the thickness of said film obtained by measuring the same with a micrometer and $t_W$ is the thickness of said film obtained by the gravimetric method.

2. A capacitor according to claim 1, wherein said film impregnated with said dielectric material is wound at a winding strength so as to cause the increment of static capacity of said capacitor of 10 to 25% by the impregnation of said dielectric material.

3. A capacitor according to claim 1, wherein 1,2-bis-(alkylphenyl)ethane comprises at least one member selected from the group consisting of
1-phenyl-2-n-propylphenylethane,
1-phenyl-2-i-propylphenylethane,
1-phenyl-2-ethylphenylethane,
1-phenyl-2-xylylethane,
1-phenyl-2-tolylethane and
1,2-ditolylethane (DTE).

4. The capacitor of claim 3, wherein the 1,2-bis-(alkylphenyl)ethane is 1-phenyl-2-n-propylphenylethane.

5. The capacitor of claim 3, wherein the 1,2-bis-(alkylphenyl)ethane is 1-phenyl-2-i-propylphenylethane.

6. The capacitor of claim 3, wherein the 1,2-bis-(alkylphenyl)ethane is 1-phenyl-2-ethylphenylethane.

7. The capacitor of claim 3, wherein the 1,2-bis-(alkylphenyl)ethane is 1-phenyl-2-xylylethane.

8. The capacitor of claim 3, wherein the 1,2-bis-(alkylphenyl)ethane is 1-phenyl-2-tolylethane.

9. The capacitor of claim 3, wherein the 1,2-bis-(alkylphenyl)ethane is 1,2-ditolylethane.

* * * * *